United States Patent
Avola

(10) Patent No.: US 10,851,705 B1
(45) Date of Patent: Dec. 1, 2020

(54) VARIABLE INLET GUIDE VANE SYSTEM FOR A TURBOCHARGER USED IN A MOTOR VEHICLE

(71) Applicant: GM Global Technology Operations LLC, Detroit, MI (US)

(72) Inventor: Calogero Avola, Turin (IT)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 16/510,325

(22) Filed: Jul. 12, 2019

(51) Int. Cl.
*F02B 37/22* (2006.01)
*F02C 9/20* (2006.01)

(52) U.S. Cl.
CPC .............. *F02B 37/225* (2013.01); *F02C 9/20* (2013.01); *F05D 2220/40* (2013.01); *F05D 2270/101* (2013.01)

(58) Field of Classification Search
CPC ........ F02B 37/22; F02B 37/225; F02B 37/24; F02C 6/12; F02C 9/20; F01D 17/141; F01D 17/143; F01D 17/162; F01D 17/165; F05D 2220/40; F05D 2270/101; F04D 27/002; F04D 27/0246; F04D 29/24; F04D 29/242; F04D 29/245; F04D 29/247; F04D 29/46; F04D 29/462; F04D 29/464; Y02T 10/144
See application file for complete search history.

(56) References Cited

U.S. PATENT DOCUMENTS

| 4,187,879 | A | * | 2/1980 | Fermer | ................. F04D 29/563 |
| | | | | | 137/601.07 |
| 7,549,839 | B2 | | 6/2009 | Carroll et al. | |
| 9,719,518 | B2 | | 8/2017 | Mohtar et al. | |
| 2003/0223892 | A1 | * | 12/2003 | Woollenweber | .... F04D 29/0566 |
| | | | | | 417/407 |
| 2014/0308110 | A1 | | 10/2014 | Houst et al. | |

FOREIGN PATENT DOCUMENTS

EP          3176440 A1     6/2017

\* cited by examiner

*Primary Examiner* — Jesse S Bogue
*Assistant Examiner* — Loren C Edwards

(57) ABSTRACT

A variable inlet guide vane system for a turbocharger includes a casing that forms an intake passage along a longitudinal axis. A plurality of vanes extend along corresponding transverse axes that are perpendicular to the longitudinal axis, and each vane is movably disposed within the intake passage between a high-trim position where the intake passage defines a maximum cross-sectional area for supplying airflow at a high-trim velocity and a low-trim position where the vanes define a minimum cross-sectional area for supplying airflow at a low-trim velocity. The minimum cross-sectional area is smaller than the maximum cross-sectional area such that the low-trim velocity is higher than the high-trim velocity at a common flow rate. Each vane includes an outer section rotatably coupled to the casing and an inner section, which extends from the outer section along the transverse axis and is angularly spaced from the outer section about the transverse axis.

20 Claims, 8 Drawing Sheets

VARIABLE INLET GUIDE VANE SYSTEM FOR A TURBOCHARGER USED IN A MOTOR VEHICLE

INTRODUCTION

The present disclosure relates to a turbocharger for a motor vehicle, and more particularly to a variable inlet guide vane system for increasing the operating range of a radial compressor for a turbocharger without sacrificing compressor efficiency or stability.

Automotive manufacturers continuously explore strategies for expanding the operating range of compressors. This operating range is typically presented on a compressor map with boost or pressure ratio (discharge pressure divided by inlet pressure) on the vertical axis and corrected mass flow rate on the horizontal axis. The operating range is generally limited on the left by a surge line and on the right by a choke line.

Surge is a condition where the compressor stalls when the mass flow rate falls below a minimum threshold and/or the pressure ratio rises above a maximum threshold on the surge line. The air flow can no longer adhere to the blades and discharge of pressurized air rapidly fluctuates. More specifically, the airflow reverses until a stable pressure ratio with positive mass flow rate is reached, and when the pressure ratio again exceeds the maximum threshold, the cycle repeats. This flow instability continues at a fixed frequency, which produces an audible sound known as "surging" or "fluttering" and prevents the turbocharger from providing the desired boost.

Choke is a condition where the compressor reaches its maximum volume flow rate. The efficiency of the turbocharger decreases as the flow rate approaches the choke line. When the flow rate at the wheel inlet reaches sonic velocity, no further increase in flow rate is possible.

Thus, while current turbochargers achieve their intended purpose, there is a need for a new and improved forced induction device that addresses these issues.

SUMMARY

According to several aspects, a variable inlet guide vane system (VIGV system) for a turbocharger of a motor vehicle is provided. The VIGV system includes a casing that forms an intake passage extending along a longitudinal axis and fluidly connected to the compressor. The VIGV system further includes a plurality of vanes, with each vane extending along a transverse axis that is perpendicular to the longitudinal axis. Each vane is movably disposed within the intake passage between a high-trim position where the casing defines a maximum inlet cross-sectional area for supplying airflow at a high-trim velocity and a low-trim position where the vanes and the casing cooperate with one another to define a minimum inlet cross-sectional area for supplying airflow at a low-trim velocity. The minimum inlet cross-sectional area is smaller than the maximum inlet cross-sectional area such that the low-trim velocity is higher than the high-trim velocity at a common mass flow rate. Each vane includes an outer section rotatably coupled to the casing and an inner section extending from the outer section along the transverse axis. The outer section and the inner section are angularly spaced from each other about the transverse axis such that the inner sections provide a circumferential vector of the low-trim velocity. The system further includes an actuator configured to move the plurality of vanes between the high-trim position and the low-trim position.

In one aspect, the outer sections and the casing cooperate with one another to define the minimum inlet cross-sectional area for providing an axial vector of the low-trim velocity when the vanes are disposed in the low-trim position.

In another aspect, when the vanes are disposed in the low-trim position, the outer sections of the vanes are disposed adjacent to one another for blocking airflow between one another, and the inner sections of the vanes are spaced apart from one another for directing airflow between one another and into a swirling pattern about the longitudinal axis.

In another aspect, each of the outer section and the inner section comprises a planar surface, and the planar surfaces are angularly spaced from one another about the transverse axis.

In another aspect, the corresponding planar surfaces of the outer section and the inner section are angularly spaced from one another by a fixed angle in the range between 20 and 40 degrees, inclusively.

In another aspect, the planar surfaces of the outer sections are disposed perpendicularly to the longitudinal axis when the vanes are disposed in the low-trim position.

In another aspect, the planar surfaces of the outer sections are movable to up to 89 degrees relative to the longitudinal axis, where the planar surfaces of the outer sections are spaced apart from one another to direct airflow between the outer sections and into a swirling direction about the longitudinal axis.

In another aspect, the planar surfaces of the outer sections are disposed parallel with the longitudinal axis when the vanes are disposed in the high-trim position.

In another aspect, the planar surfaces of the inner sections are angularly spaced from the longitudinal axis to direct airflow in a swirling pattern about the longitudinal axis when the vanes are disposed in any position between the high-trim position and the low-trim position.

In another aspect, each vane is a single-piece body including the outer section and the inner section.

According to several aspects, a turbocharger of a motor vehicle is provided. The turbocharger includes a turbine housing defining a turbine chamber adapted to receive exhaust gas. The turbocharger further includes a compressor housing defining a compressor inlet having an inlet diameter adapted to receive an airflow. The compressor housing further defines a compressor chamber fluidly connected to the compressor inlet. The turbocharger further includes a center housing disposed axially between the turbine housing and the compressor housing. The turbocharger further includes a turbine wheel disposed in the turbine chamber and driven by exhaust gases. The turbocharger further includes a compressor wheel disposed in the compressor chamber for pressurizing the airflow to the internal combustion engine. The turbocharger further includes a shaft having a first end connected to the turbine wheel and a second end connected to the compressor wheel, such that the turbine wheel is capable of driving the compressor wheel to increase the pressure of intake air for the engine. The turbocharger further includes a VIGV system. The VIGV system includes a casing coupled to the compressor housing and forming an intake passage along a longitudinal axis. The intake passage is fluidly connected to the compressor inlet and disposed upstream of the compressor inlet. The VIGV system further includes a plurality of vanes, with each vane extending along a transverse axis that is perpendicular to the longitudinal axis. Each vane is movably disposed within the intake passage between a high-trim position where the casing defines a maximum inlet cross-sectional area for supplying airflow to the compressor wheel at a high-trim velocity and a low-trim position where the vanes and the casing cooperate with one another to define a minimum inlet cross-sectional area for supplying airflow to the compressor wheel at a low-trim velocity. The minimum inlet cross-sectional area is smaller than the maximum inlet cross-sectional area such that the low-trim velocity is higher than the high-trim velocity at a common mass flow rate. Each vane includes an outer section rotatably coupled to the casing and an inner section extending from the outer section along the transverse axis. The outer section and the inner section are angularly spaced from each other about the transverse axis such that the inner sections provide a circumferential vector of the low-trim velocity. The VIGV system further includes an actuator configured to move the vanes between the high-trim position and the low-trim position.

In one aspect, the outer section of each vane has a length along the transverse axis that is within the range between 35% and 50% of the inlet diameter of the compressor inlet.

In another aspect, the outer sections and the casing cooperate with one another to define the minimum inlet cross-sectional area for providing an axial vector of the low-trim velocity when the vanes are disposed in the low-trim position.

In another aspect, when the vanes are disposed in the low-trim position, the outer sections of the vanes are disposed adjacent to one another for blocking airflow between one another, and the inner sections of the vanes are spaced apart from one another for directing airflow between one another and into a swirling pattern about the longitudinal axis.

In another aspect, each of the outer section and the inner section include a planar surface, and the planar surfaces are angularly spaced from one another about the transverse axis.

In another aspect, the planar surfaces of the outer sections are disposed perpendicularly to the longitudinal axis when the vanes are disposed in the low-trim position.

In another aspect, the planar surfaces of the outer sections are movable to up to 89 degrees relative to the longitudinal axis, where the planar surfaces of the outer sections are spaced apart from one another to direct airflow between the outer sections and into a swirling direction about the longitudinal axis.

In another aspect, the planar surfaces of the outer sections are disposed parallel with the longitudinal axis when the vanes are disposed in the high-trim position.

In another aspect, the planar surfaces of the inner sections are angularly spaced from the longitudinal axis to direct airflow in a swirling pattern about the longitudinal axis when the vanes are disposed in any position between the high-trim position and the low-trim position.

According to several aspects, a turbocharger of a motor vehicle is provided. The turbocharger includes a turbine housing that defines a turbine chamber. The turbocharger further includes a compressor housing defining a compressor inlet, which forms an intake passage along a longitudinal axis and an inlet diameter adapted to receive an airflow. The compressor housing further defines a compressor chamber fluidly connected to the compressor inlet. The turbocharger further includes a center housing disposed axially between the turbine housing and the compressor housing. The turbocharger further includes a turbine wheel disposed in the turbine chamber and driven by exhaust gases. The turbocharger further includes a compressor wheel disposed in the compressor chamber for pressurizing the airflow to the internal combustion engine. The turbocharger further includes a shaft having a first end connected to the turbine wheel and a second end connected to the compressor wheel, such that the turbine wheel is capable of driving the compressor wheel to increase the pressure of intake air for the engine. The turbocharger further includes a VIGV system coupled to the compressor housing. The VIGV system includes a plurality of vanes, with each vane extending along a transverse axis that is perpendicular to the longitudinal axis. Each vane is movably disposed within the intake passage between a high-trim position where the compressor housing defines a maximum inlet cross-sectional area for supplying airflow to the compressor wheel at a high-trim velocity and a low-trim position where the vanes and the compressor housing cooperate with one another to define a minimum inlet cross-sectional area for supplying airflow to the compressor wheel at a low-trim velocity. The minimum inlet cross-sectional area is smaller than the maximum inlet cross-sectional area such that the low-trim velocity is higher than the high-trim velocity at a common mass flow rate. Each vane includes an outer section rotatably coupled to the compressor housing and an inner section extending from the outer section along the transverse axis. The outer section and the inner section are angularly spaced from each other about the transverse axis such that the inner sections provide a circumferential vector of the low-trim velocity and the outer sections and the compressor housing cooperate with one another to define the minimum inlet cross-sectional area for providing an axial vector of the low-trim velocity. The VIGV system further includes an actuator configured to move the vanes between the high-trim position and the low-trim position.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
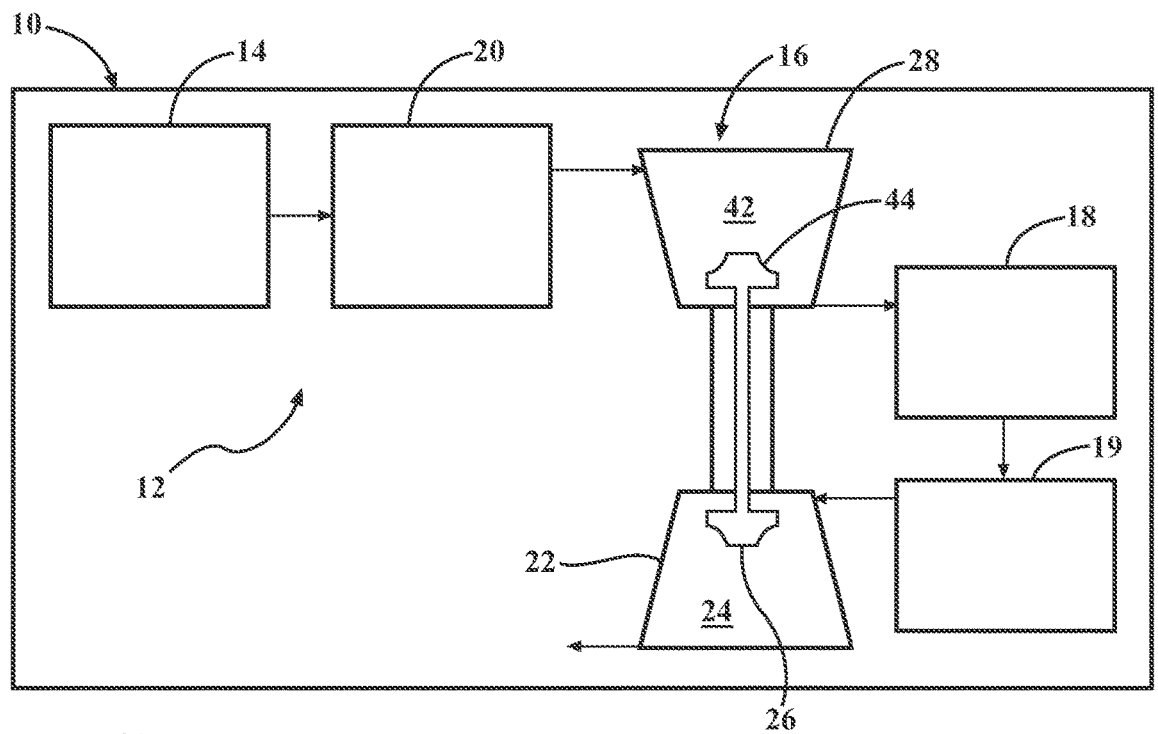
FIG. 1 is a schematic diagram of a motor vehicle having a powertrain including a turbocharger and a variable inlet guide vane system (VIGV system) for increasing the operating range of the turbocharger without reducing the efficiency of the same.

Referring to FIG. 1, a motor vehicle 10 includes a powertrain 12 including an air filter 14 adapted to receive fresh intake air. The powertrain 12 further includes a turbocharger 16, which is configured to pressurize the fresh intake air. The powertrain 12 further includes a charge air cooler 18 fluidly connected to the turbocharger 16 to remove heat from the pressurized air. The powertrain 12 further includes an internal combustion engine 20 fluidly connected to the charge air cooler 18 for generating power from the combustion of fuel-air mixture, which produces exhaust gases that drive the turbocharger 16. The powertrain 12 further includes a variable inlet guide vane system 20 (VIGV system), which is fluidly connected to the turbocharger 16. As will be described in detail below, the VIGV system 20 is configured to improve the operating range and efficiency of the turbocharger 16, which in turn improves engine fuel consumption and power output. However, it is contemplated that the VIGV system can be coupled to or be an integral portion of any suitable device to improve its operating range and efficiency.

Figure 2:
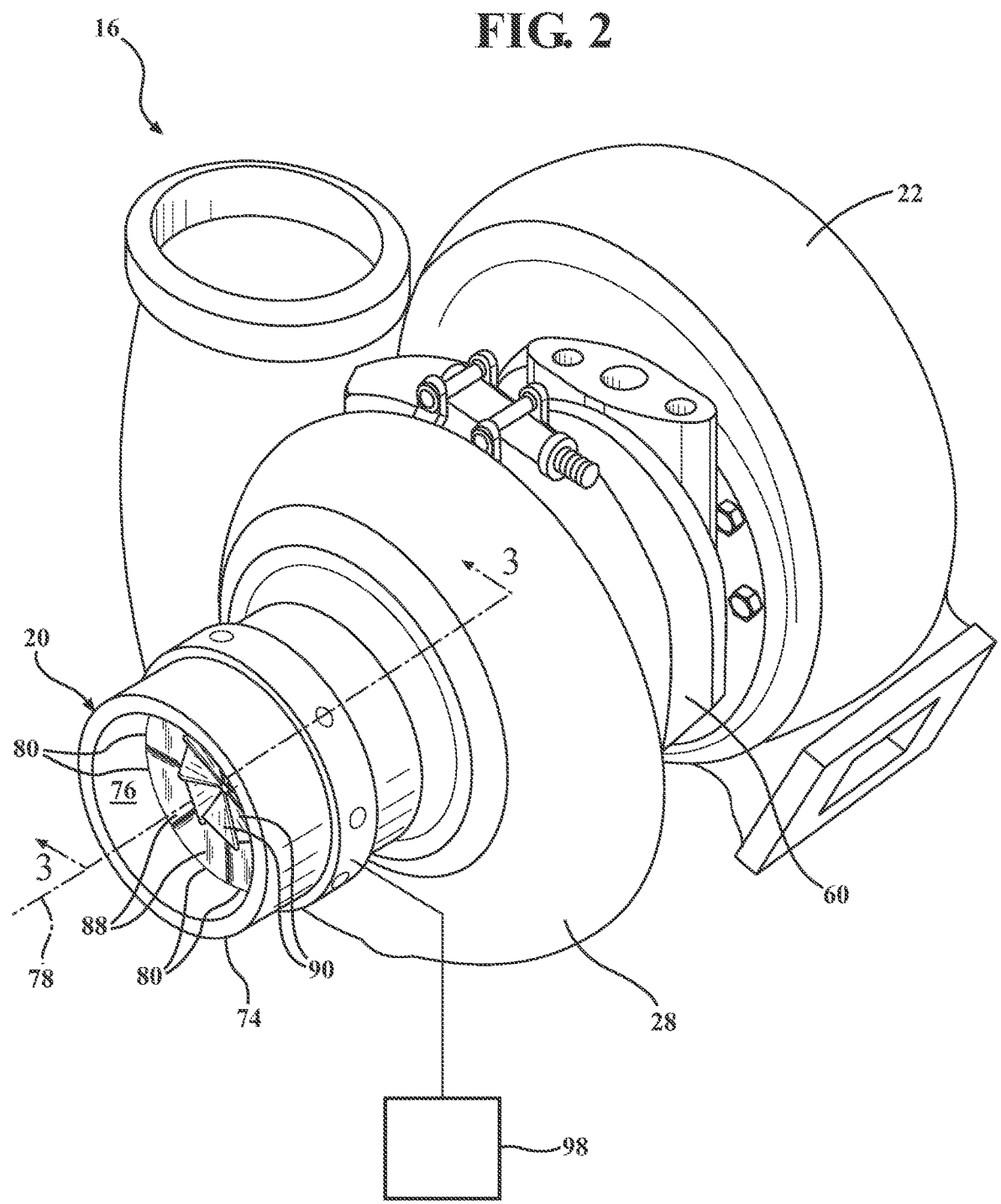
FIG. 2 is a perspective view of the VIGV system fluidly connected to the turbocharger of FIG. 1.
Figure 3:
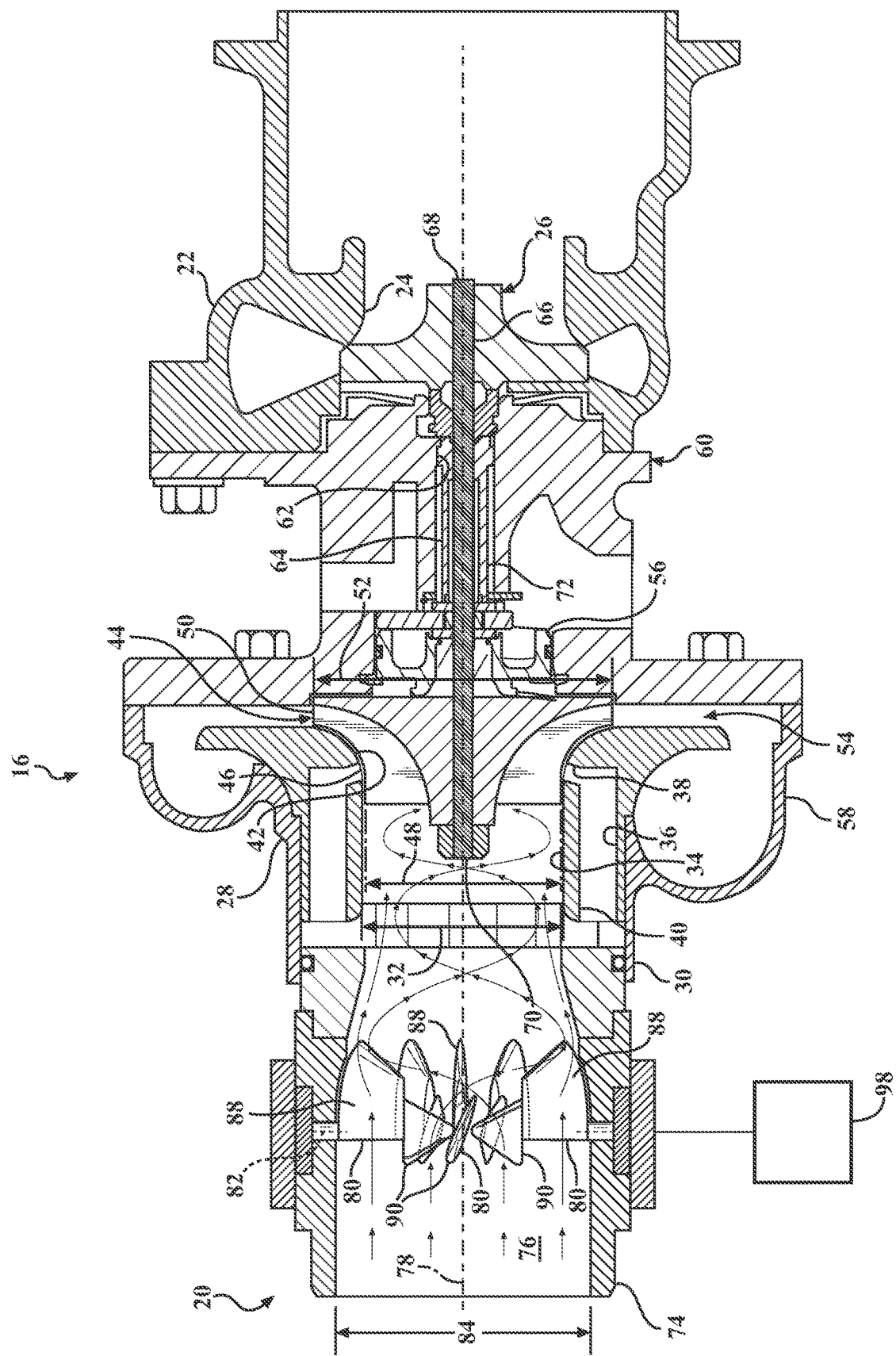
FIG. 3 is a cross-sectional view of the VIGV system and the turbocharger of FIG. 2 as taken along line 3-3, illustrating the VIGV having a plurality of split vanes moved to a high-trim position to provide a maximum inlet cross-sectional area for supplying airflow to a compressor of the turbocharger.

Referring to FIGS. 2 and 3, the turbocharger 16 may be any suitable type of turbocharger without departing from the scope or intent of the present disclosure. For example, the turbocharger 16 may be a single-scroll turbocharger, a twin-scroll turbocharger, a variable geometry turbocharger, an electric turbocharger, or the like.

Referring to FIG. 3, the turbocharger 16 includes a turbine housing 22, which defines a turbine chamber 24, and a turbine wheel 26, which is disposed in the turbine chamber 24 and driven by exhaust gases from the engine 19.

Figure 6:
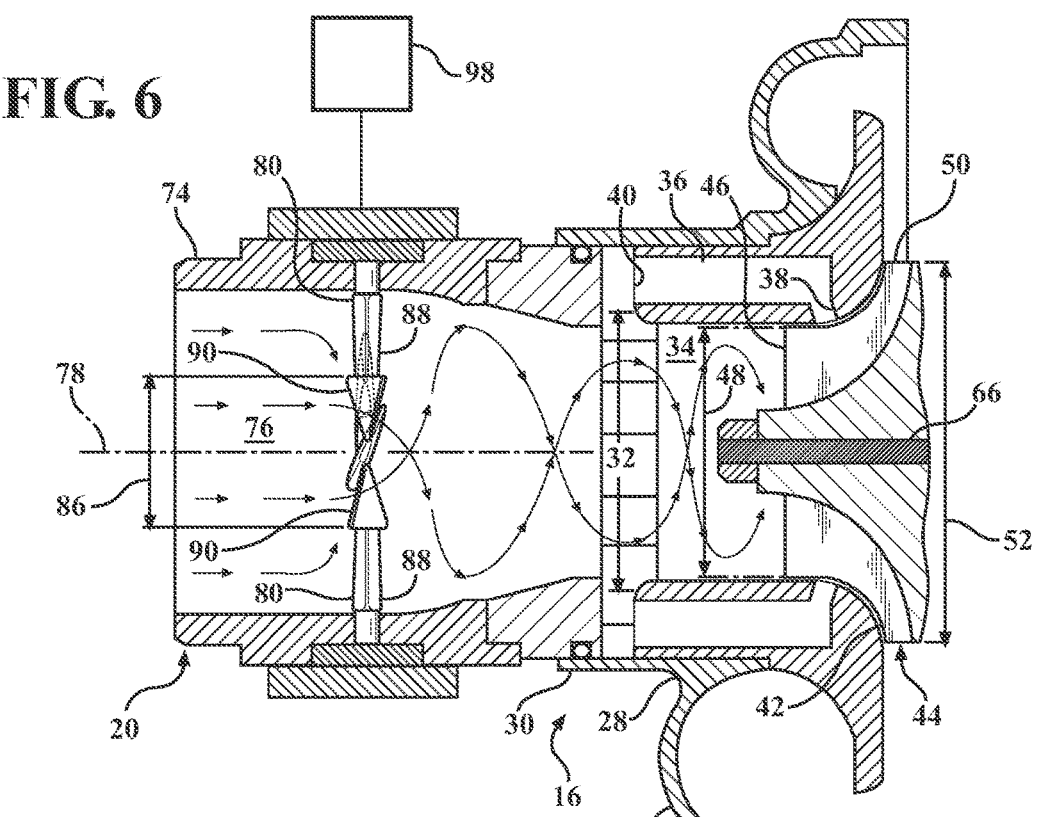
FIG. 6 is a cross-sectional view of the VIGV system and the turbocharger of FIG. 3, illustrating the VIGV system having vanes disposed in a low-trim position to reduce the inlet cross-sectional area for compressor and increase flow velocity to the same.

The turbocharger 16 further includes a compressor housing 28, which has a compressor inlet 30 forming an inlet diameter 32 adapted to receive an airflow. In this example, the compressor inlet 30 is a ported shroud configured to inhibit the onset of surge conditions at mass flow rates that are lower than a predetermined surge line associated with the compressor wheel 44. Put another way, the ported shroud recirculates airflow from a downstream location to an upstream location so as to expand the operating range of the compressor wheel 44. More specifically, the compressor inlet 30 defines a primary passage 34 and a plurality of supplemental passages 36 disposed parallel to the primary passage 34. The wall thickness of the shroud forms the supplemental passages 36 circumferentially about the primary passage 34. Each supplemental passage 36 extends from a first port 38, which is fluidly connected to the primary passage 34, to a second port 40, which is fluidly connected to the primary passage 34 upstream of the first port 38. Furthermore, at mass flow rates approach the choke line, the supplemental passages 36 are configured to inhibit the onset of choke conditions by bleeding airflow from the supplemental passages 36. While FIGS. 3 and 6 illustrate the compressor housing being a ported shroud, it is contemplated that the compressor housing may not be a ported shroud and not include the supplemental passages.

The compressor housing 28 further defines a compressor chamber 42 fluidly connected to the primary passage 34 and the supplemental passages 36 of the compressor inlet 30. The turbocharger 16 further includes a compressor wheel 44 disposed in the compressor chamber 42 for pressurizing an airflow to the engine 20. The compressor wheel 44 includes an inducer 46 having an outer diameter 48 configured to draw air axially toward the compressor wheel 44. The compressor wheel 44 further includes an exducer 50 having an outer diameter 52 configured to accelerate the air and expel the same radially. The compressor housing 28 further includes a diffuser 54 configured to slow down the high-velocity air without losses so as to increase pressure and temperature of the air. The diffuser 54 includes an annular backplate 56 connected directly to the compressor housing 28, and a portion of a volute 58 defined by the compressor housing 28.

The compressor wheel 44 has trim, which can determine the operating capacity and efficiency of the compressor wheel 44. Trim is an inducer area function that corresponds with the outer diameter 48 of the inducer 46 and the outer diameter 52 of the exducer 50. While trim may be defined with respect to diameters of a compressor wheel 44, the size of an inlet cross-sectional area that supplies air to the inducer 46 may effectively alter the outer diameter of the inducer and associated trim. Put another way, decreasing the inlet cross-sectional area may effectively reduce trim and increase flow velocity so as to move the surge line toward the left on the compressor map for a lower corrected mass flow. Furthermore, increasing the inlet cross-sectional area may effectively increase trim and decrease flow velocity so as to move the surge line toward a higher corrected flow.

The turbocharger 16 further includes a center housing 60 disposed axially between the turbine housing 22 and the compressor housing 28. The center housing 60 includes a bearing support surface 62 defining a bearing cavity 64 extending along an axis between the turbine housing 22 and the compressor housing 28.

The turbocharger 16 further includes a shaft 66 having a first end 68 connected to the turbine wheel 26 and a second end 70 connected to the compressor wheel 44, such that the turbine wheel 26 is capable of driving the compressor wheel 44 to increase the pressure of intake air for the engine. The turbocharger 16 further includes a bearing 72 configured to rotatably mount the shaft 68 to the center housing 60.

The VIGV system 20 is configured to increase flow velocity at low mass flow rates to avoid surge conditions. The VIGV system 20 includes a casing 74 coupled to the compressor housing 28 and forms an intake passage 76 along a longitudinal axis 78. The intake passage 76 is fluidly connected to the compressor inlet 30 and disposed upstream of the compressor inlet 30.

Figure 4:
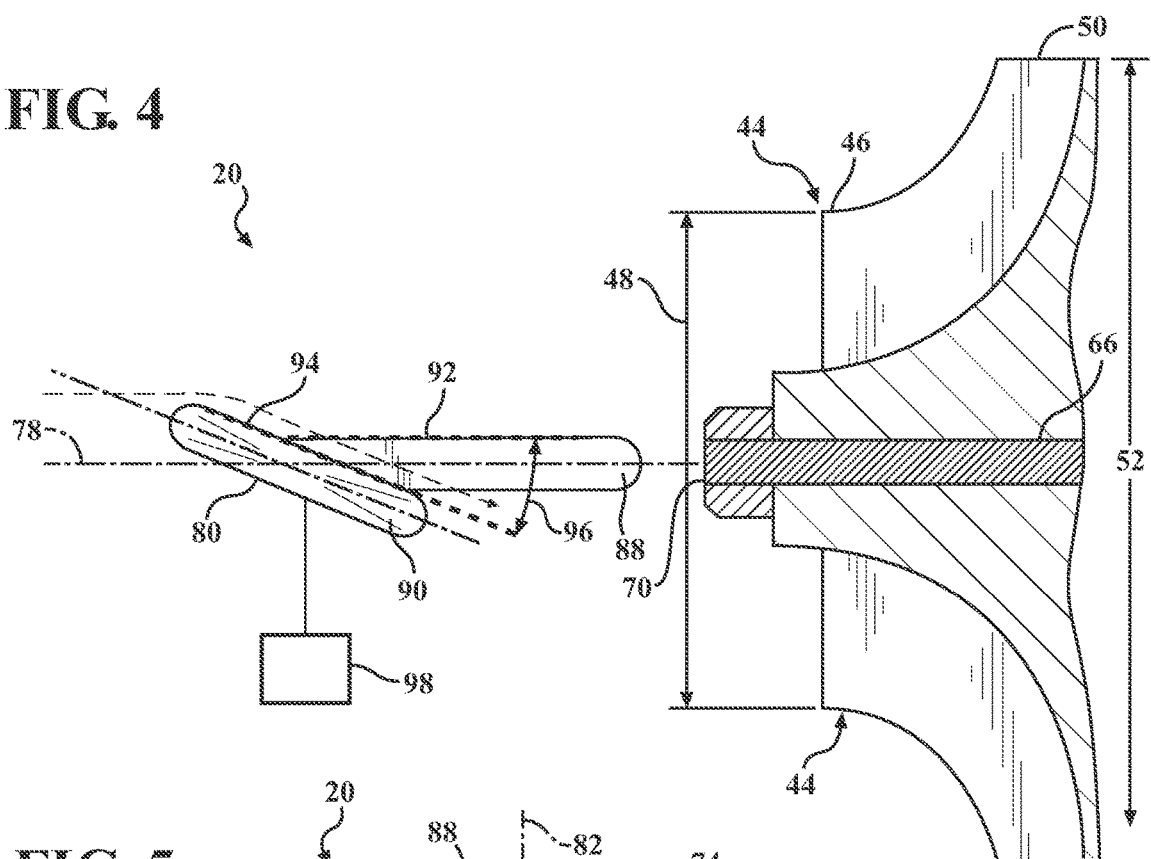
FIG. 4 is an enlarged end view of one of the vanes of FIG. 3, illustrating the vane disposed in the high-trim position relative to a longitudinal axis of the VIGV system and the compressor of the turbocharger.
Figure 5:
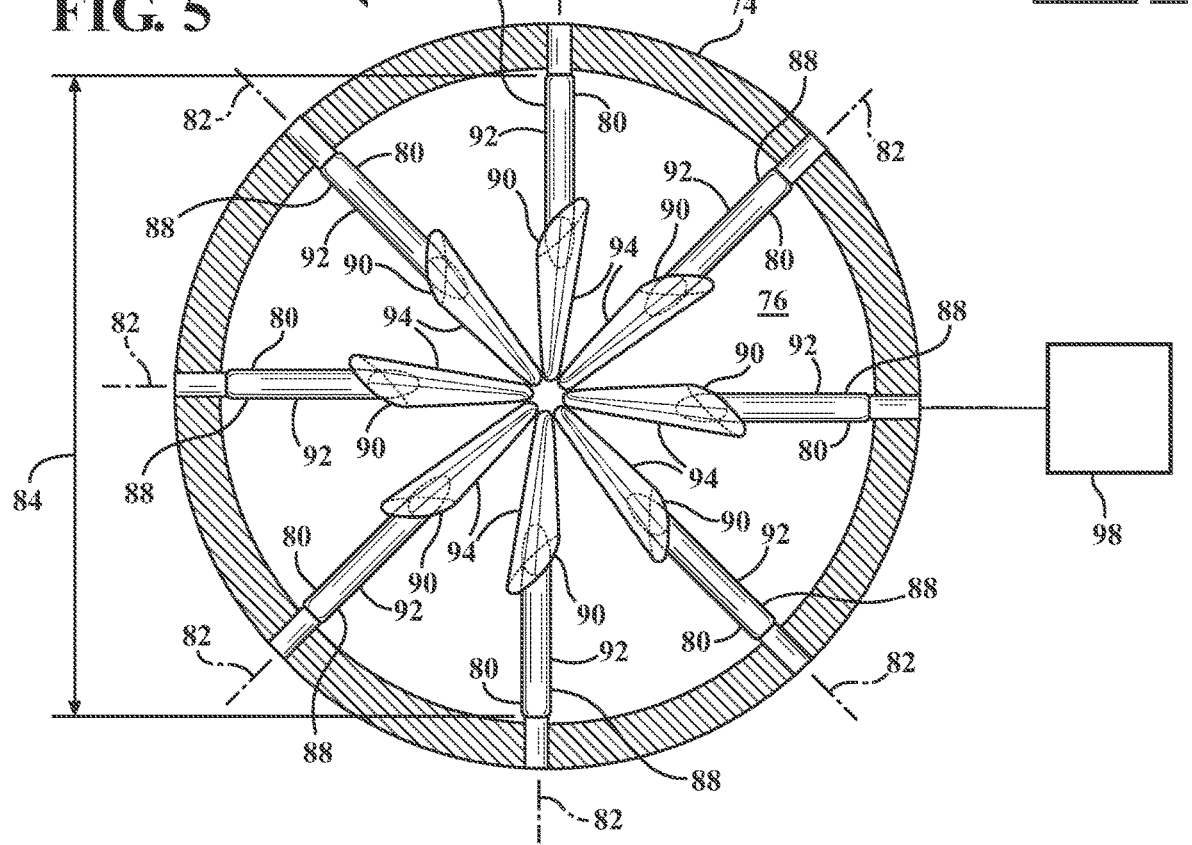
FIG. 5 is an end view of the VIGV system of FIG. 3.
Figure 7:
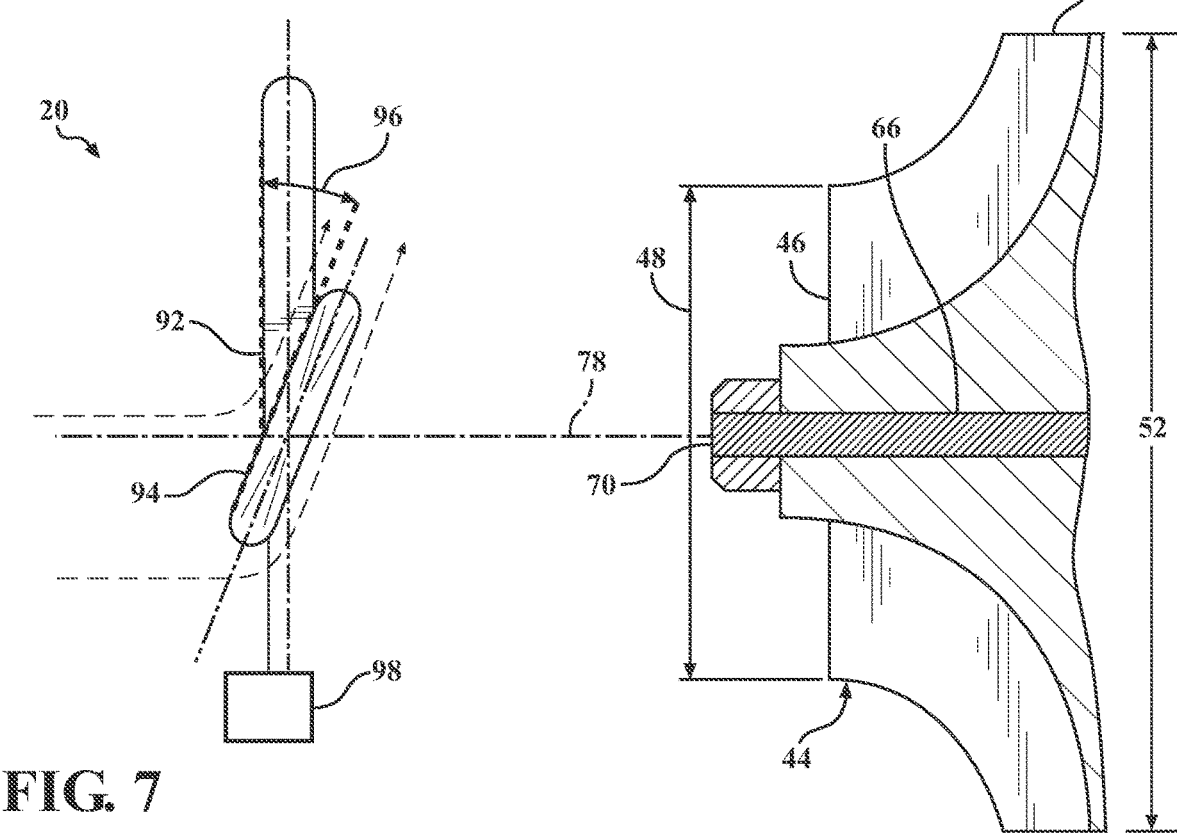
FIG. 7 is an enlarged end view of one of the vanes for the VIGV system of FIG. 6, illustrating the splits vanes disposed in the low-trim position to provide a minimum inlet cross-sectional area for increasing flow velocity to the compressor.

The VIGV system 20 further includes a plurality of split vanes 80, with each vane 80 extending along a transverse axis 82 (FIG. 5) that is perpendicular to the longitudinal axis 78. Each vane 80 is movably disposed within the intake passage 76 between a high-trim position (FIGS. 3-5) where the casing 74 defines a maximum inlet cross-sectional area 84 for supplying airflow to the compressor wheel 44 at a high-trim velocity and a low-trim position (FIGS. 6-8) where the vanes 80 and the casing 74 cooperate with one another to define a minimum inlet cross-sectional area 86 for supplying airflow to the compressor wheel 44 at a low-trim velocity. The minimum inlet cross-sectional area 86 (FIGS. 6 and 8) is smaller than the maximum inlet cross-sectional area 84 (FIGS. 3 and 5) such that the low-trim velocity is higher than the high-trim velocity at a common mass flow rate.

Figure 9:
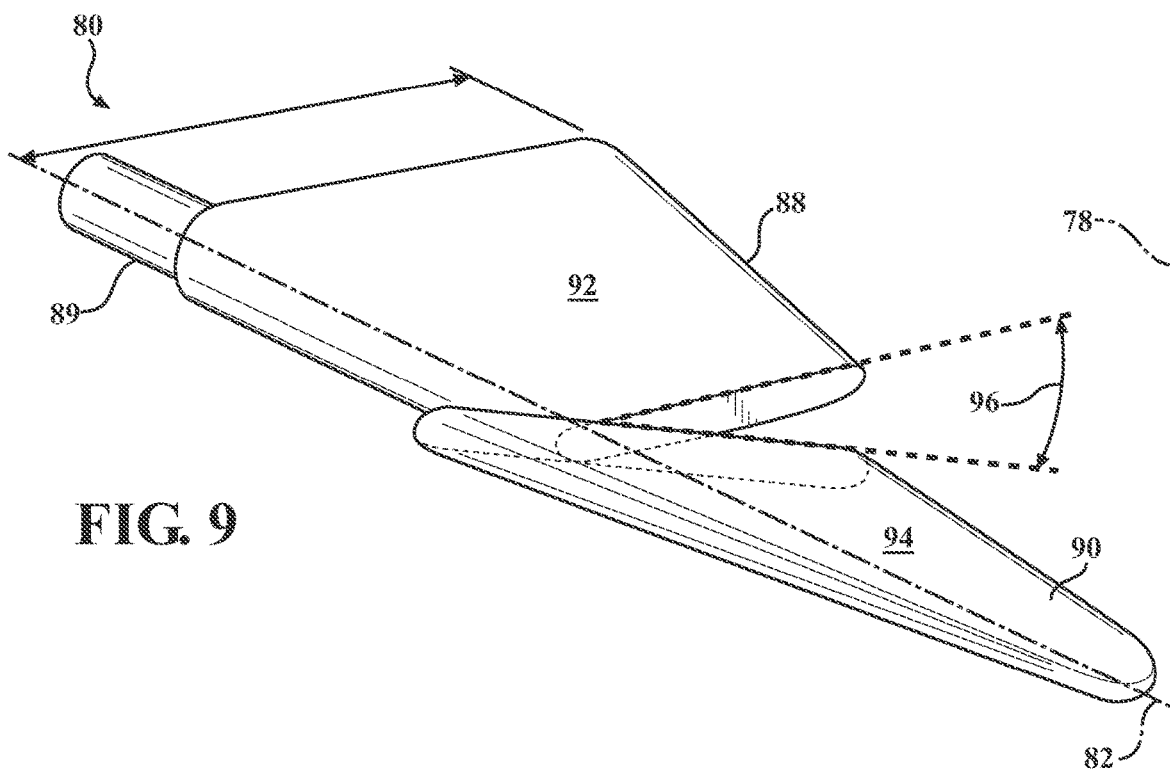
FIG. 9 is a perspective view of one of the vanes of FIG. 2.

Referring to FIG. 9, each split vane 80 includes an outer section 88 rotatably coupled to the casing 74 and an inner section 90 extending from the outer section 88 along the transverse axis 82. The outer section 88 and the inner section 90 are angularly spaced from each other about the transverse axis 82 by an angle 96 such that the inner sections 90 provide a circumferential vector of the low-trim velocity as described in more detail below. In this example, each of the outer section 88 and the inner section 90 includes a corresponding planar surface 92, 94 and the planar surfaces 92, 94 are angularly spaced from one another about the transverse axis 82 by an angle 96.

Referring back to FIGS. 3-5, the planar surfaces 92 of the outer sections 88 are disposed parallel with the longitudinal axis 78 when the vanes 80 are disposed in the high-trim position. The planar surfaces 94 of the inner sections 90 are angularly spaced from the longitudinal axis 78 to direct airflow in a swirling pattern about the longitudinal axis 78, when the vanes 80 are disposed in any position between the high-trim position and the low-trim position. The planar surfaces 92 of the outer sections 88 are spaced apart from one another to direct airflow between the outer sections 88 and into a swirling direction about the longitudinal axis 78, when the planar surfaces 92 of the outer sections 88 are movable to up to 89 degrees relative to the longitudinal axis 78.

Figure 8:
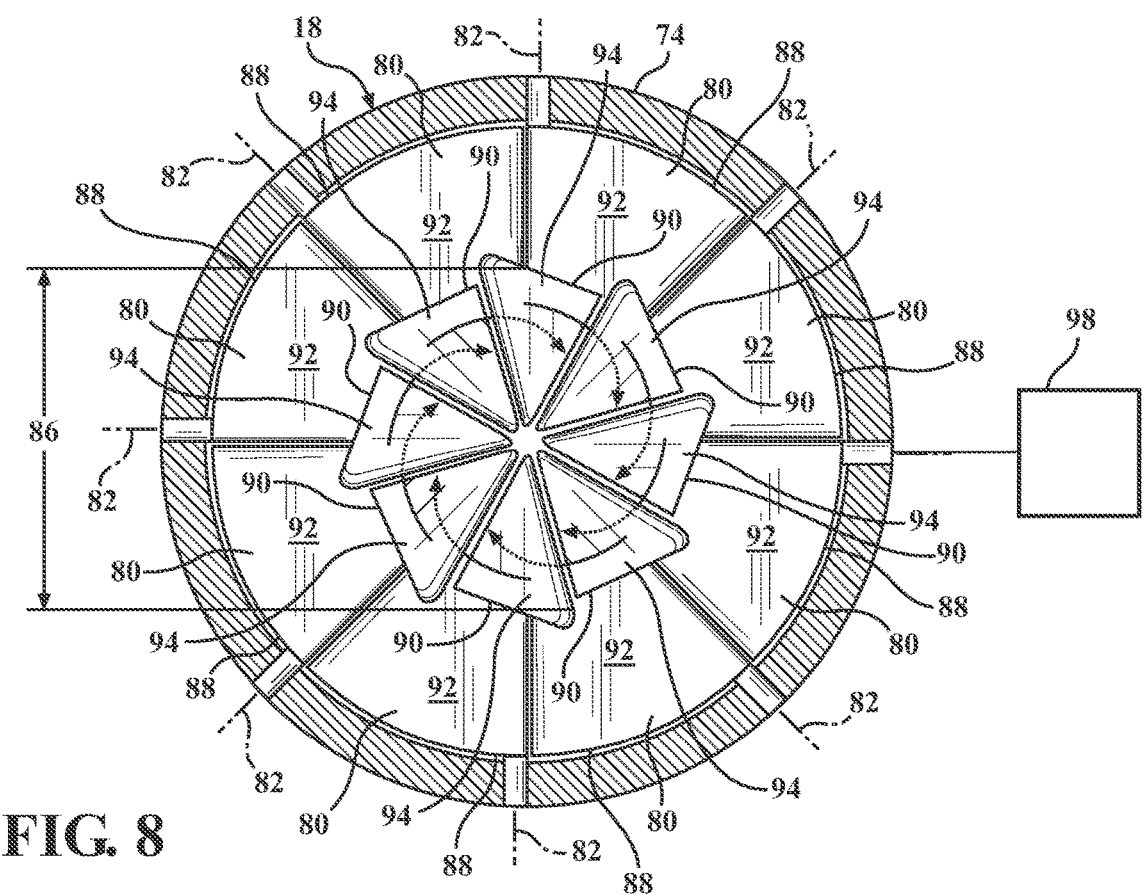
FIG. 8 is an end view of the VIGV system of FIG. 6.

Referring to FIGS. 6 and 8, the outer sections 88 and the casing 74 cooperate with one another to define the minimum inlet cross-sectional area 86 for providing an axial vector of the low-trim velocity when the vanes 80 are disposed in the low-trim position. The outer sections 88 of the vanes 80 are disposed adjacent to one another for blocking airflow between one another, and the inner sections 90 of the vanes 80 are spaced apart from one another for directing airflow between one another and into a swirling pattern about the longitudinal axis 78. The outer section 88 of each vane 80 has a length along the transverse axis 82 that is within the range between 35% and 50% of the inlet diameter 32 of off the compressor inlet 30. However, it is contemplated that the length of the outer section can any other length relative to the inlet diameter. Continuing with the previous example, the planar surfaces 92 of the outer sections 88 are disposed perpendicularly to the longitudinal axis 78 when the vanes 80 are disposed in the low-trim position.

Referring to FIGS. 3 and 6, the VIGV system 20 further includes an actuator 98 configured to move the vanes between the high-trim position and the low-trim position. The actuator 98 may include a single electric motor, a gearset receiving torque from the motor, and a pinion ring that is rotatably coupled to the compressor housing 28 and driven by the gearset to rotate about the longitudinal axis 78. Each vane can include a stem with teeth engaging teeth formed on the pinon ring, such that rotational movement of the ring causes all of the vanes to rotate in sync with one another about their respective transverse axes.

Figure 10:
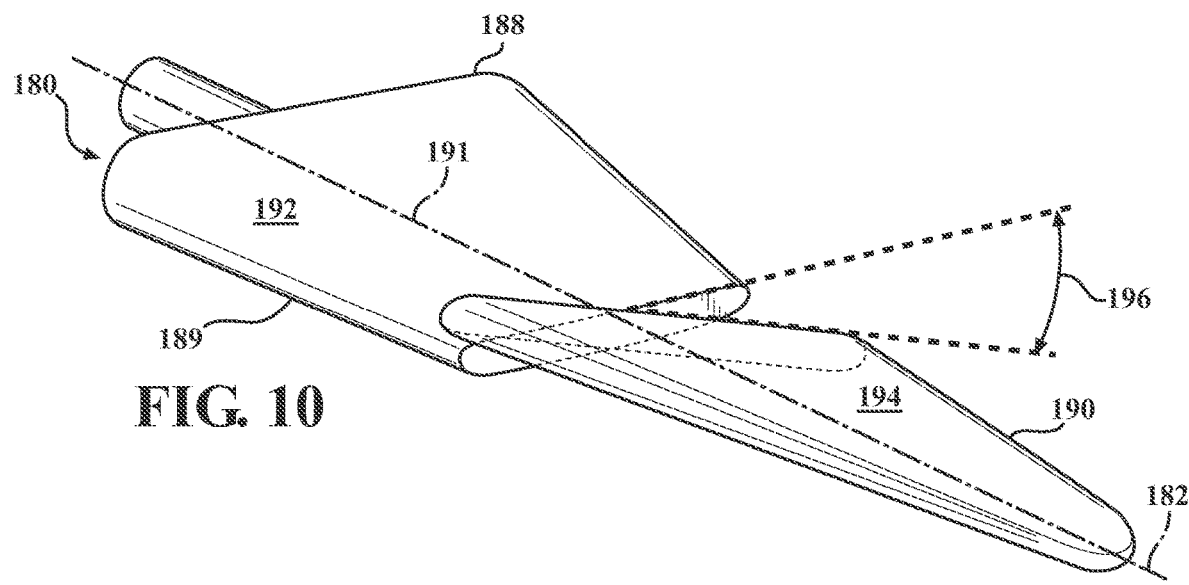
FIG. 10 is a perspective view of another embodiment of one of the vanes of the VIGV system.

Referring to FIG. 10, another embodiment of a split vane 180 is similar to the split vane 80 of FIG. 9 and includes the same components identified by the same numbers increased by 100. However, while the vane 80 of FIG. 9 includes the outer section 88 having an edge 89 pivoting on the transverse axis 82, the vane 180 of FIG. 10 has a center line 191 or center of mass pivoting on the transverse axis 182. It is contemplated that the vanes can have any number of planar or non-planar surfaces movable to any suitable positions that reduce the effective inlet cross-sectional area for increasing the axial vector of airflow velocity while also guiding airflow in a swirling pattern to provide a circumferential component of the airflow velocity, so as to increase the operating range and efficiency of the compressor.

Figure 11:
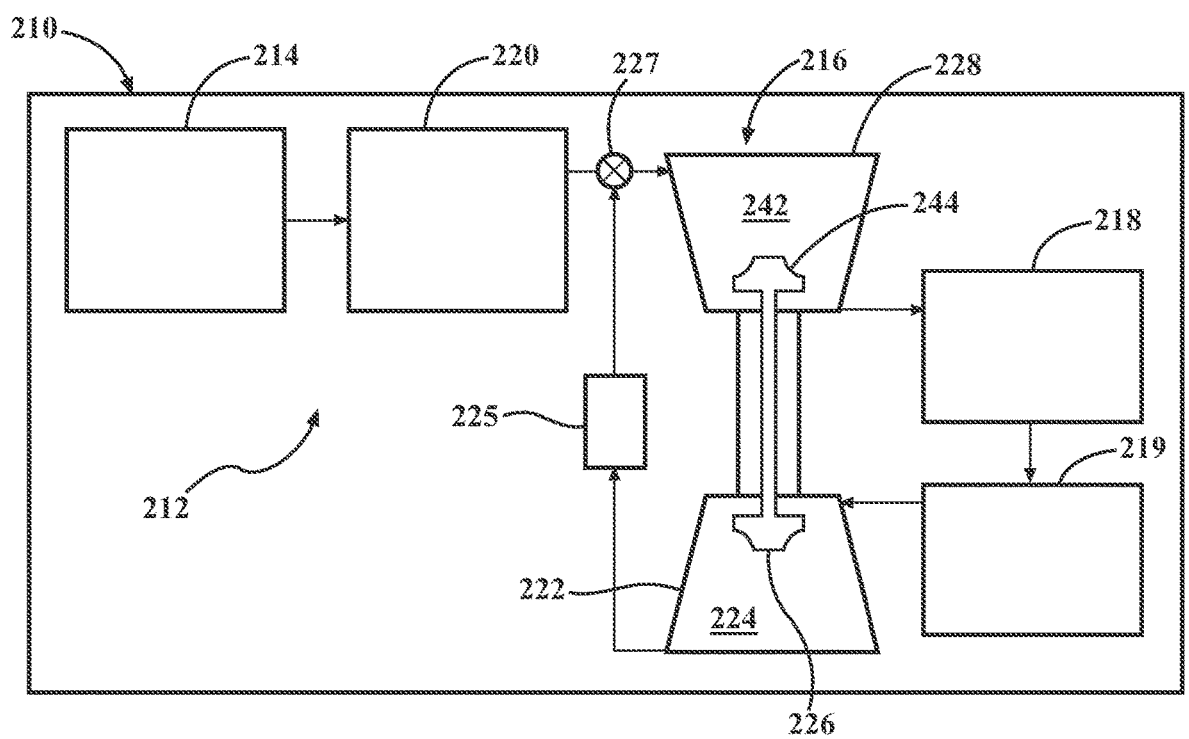
FIG. 11 is a schematic diagram of another embodiment of a motor vehicle having a powertrain that includes an exhaust gas recirculation system configured to introduce recirculated exhaust gas to a location that is downstream the VIGV system and upstream the compressor.

Referring to FIG. 11, another embodiment of a powertrain 212 is similar to the powertrain 12 of FIG. 1 and has the same components identified by the same numbers increased by 200. However, while the turbine chamber 24 of FIG. 1 is fluidly connected to the atmosphere, the turbine chamber 224 of FIG. 11 is fluidly connected to a low-pressure exhaust gas recirculation system 225 (LP EGR cooler) including a valve 227 located downstream of the VIGV system 218 and upstream of the compressor chamber 242 for introducing recirculated exhaust gas from downstream the turbine chamber 224. Still other embodiments of the powertrain can include a high-pressure exhaust gas recirculation loop. It is contemplated that the powertrain can have any suitable arrangement including the VIGV system.

Figure 12:
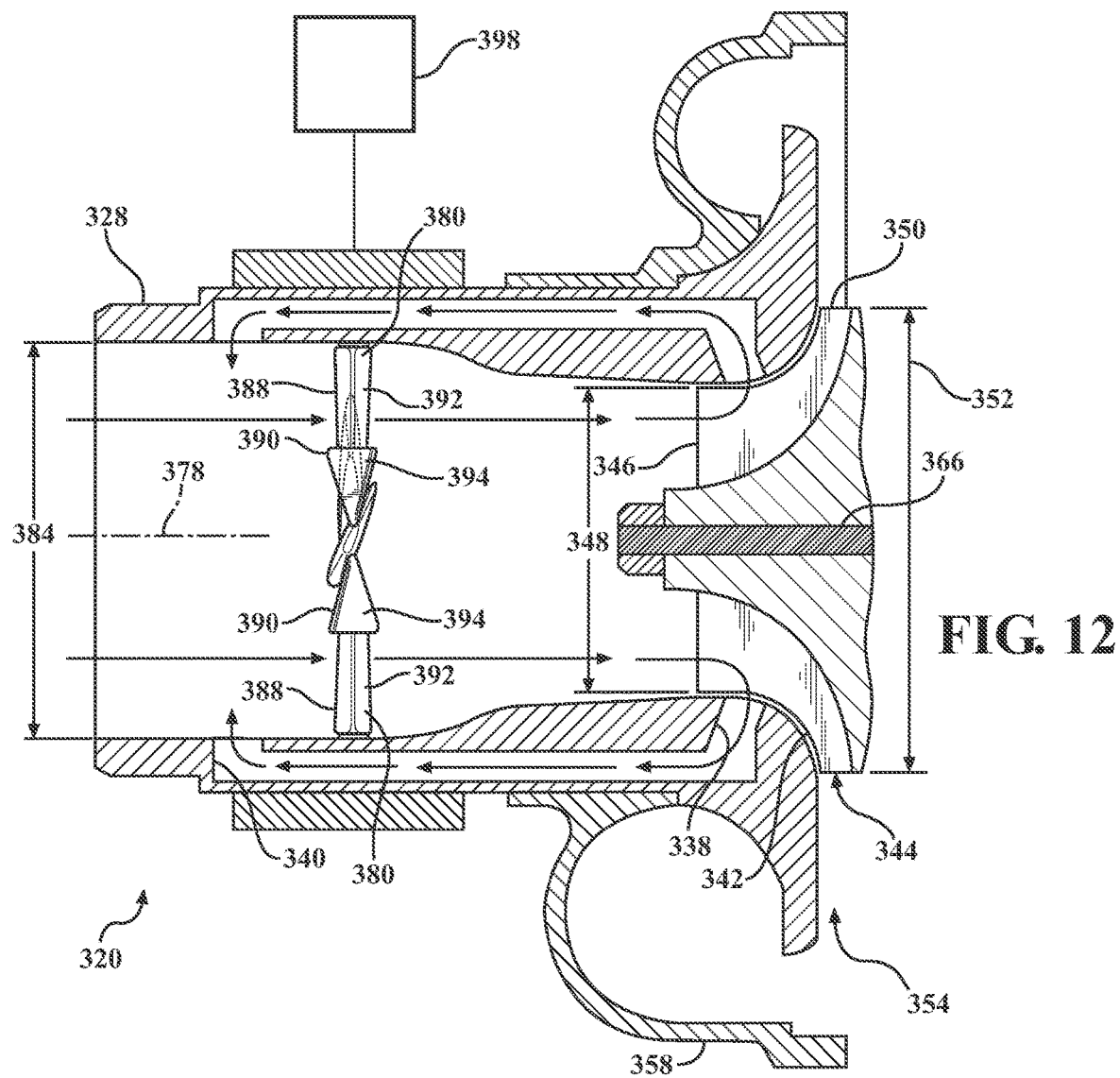
FIG. 12 is a cross-sectional view of another embodiment of a turbocharger having a compressor that includes a VIGV system and a ported shroud for recirculating air from a location downstream the VIGV to a location upstream the VIGV system to inhibit the onset of surge conditions.
Figure 13:
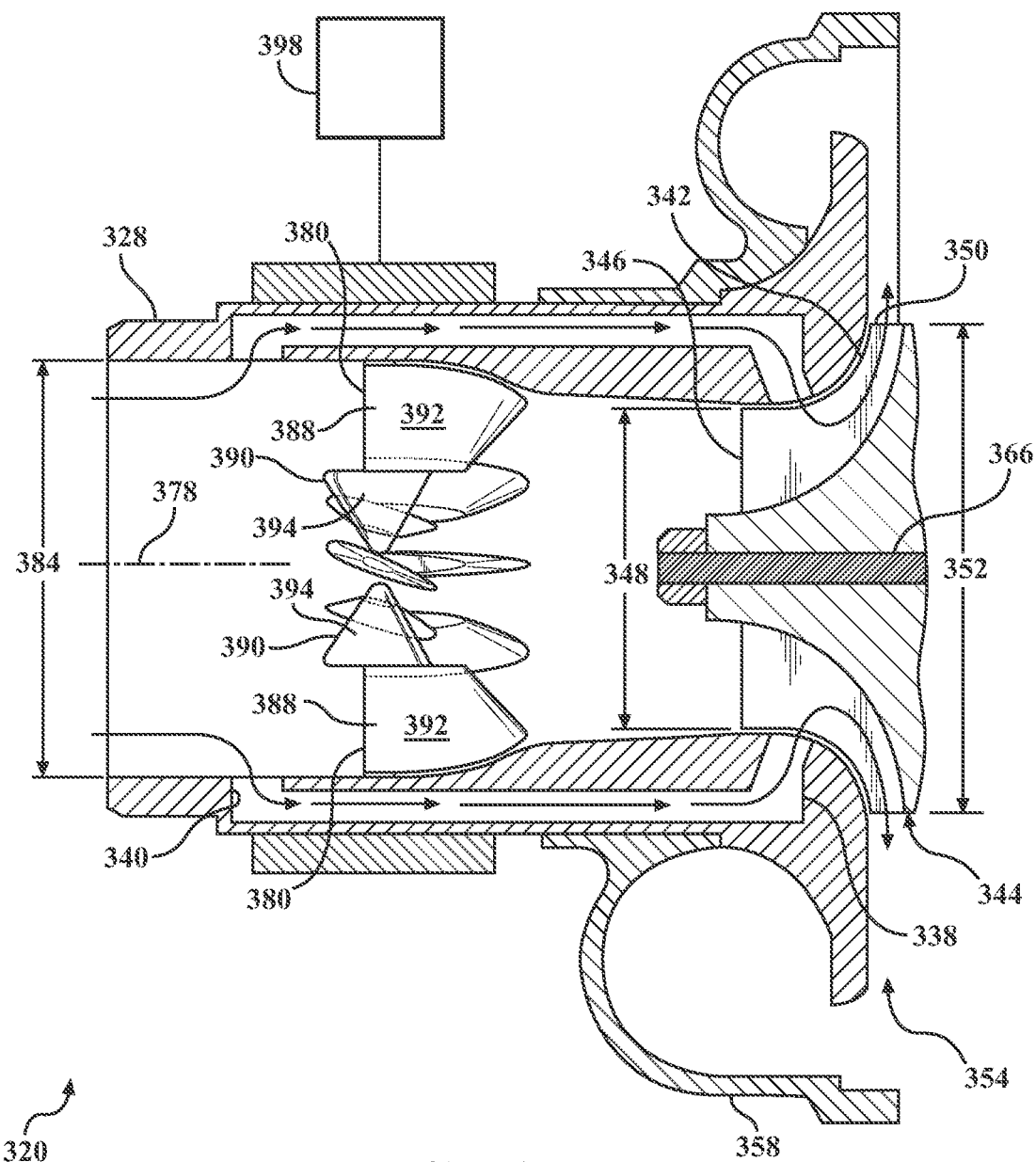
FIG. 13 is a cross-sectional view of the turbocharger of FIG. 12, illustrating the ported shroud configured to bypass the VIGV system and bleed air for inhibiting the onset of choke conditions.

Referring to FIGS. 12 and 13, another embodiment of the VIGV system 320 is similar to the VIGV system 20 of FIG. 3 and includes the same components identified by the same numbers increased by 300. However, while the vanes 80 of FIG. 3 are rotatably coupled to the casing 74 that is a separate component attached to the compressor housing 28, the vanes 380 of FIGS. 12 and 13 are rotatably connected directly to the compressor housing 328, such that the VIGV system 320 is an integral part of the turbocharger 316. Furthermore, while the compressor housing 28 of FIG. 3 includes a supplemental passage 36 with the second ports 40 disposed downstream the vanes 80, the compressor housing 328 of FIGS. 12 and 13 includes second ports 340 disposed upstream of the vanes 380. In this way, as shown in FIG. 12, airflow can be recirculated from a location downstream of the vanes 380 to a location upstream of the vanes 380 to inhibit the onset of a surge condition. Furthermore, as shown in FIG. 13, airflow upstream the vanes 380 can bypass the vanes 380 toward the compressor chamber 342 to inhibit the onset of choke conditions.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A variable inlet guide vane system for a turbocharger used in a motor vehicle, the turbocharger including a compressor, the variable inlet guide vane system comprising:
  a casing forming an intake passage along a longitudinal axis;
  a plurality of vanes disposed within the intake passage, with each of the vanes extending along a transverse axis that is perpendicular to the longitudinal axis, and wherein each of the vanes is rotatable about the transverse axis between a high-trim position where the casing defines a maximum inlet cross-sectional area for supplying an airflow to the compressor at a high-trim velocity and a low-trim position where the vanes and the casing cooperate with one another to define a minimum inlet cross-sectional area for supplying the airflow to the compressor at a low-trim velocity, wherein the minimum inlet cross-sectional area is smaller than the maximum inlet cross-sectional area such that the low-trim velocity is higher than the high-trim velocity at a common mass flow rate, and each of the vanes comprises:
  an outer section rotatably coupled to the casing and extending along the transverse axis;
  an inner section extending from the outer section and extending along the transverse axis, wherein the outer section and the inner section are angularly spaced from each other about the transverse axis by a fixed angle such that the inner sections of the vanes provide a circumferential vector of the low-trim velocity; and
an actuator configured to move the plurality of vanes between the high-trim position and the low-trim position.

2. The variable inlet guide vane system of claim 1 wherein the outer sections of the vanes and the casing cooperate with one another to define the minimum inlet cross-sectional area for providing an axial vector of the low-trim velocity in response to the vanes being disposed in the low-trim position.

3. The variable inlet guide vane system of claim 2 wherein, in response to the vanes being disposed in the low-trim position, the outer sections of the vanes are disposed adjacent to one another for blocking the airflow between one another, and the inner sections of the vanes are spaced apart from one another for directing the airflow between one another and swirling the airflow about the longitudinal axis.

4. The variable inlet guide vane system of claim 3 wherein each of the outer section and the inner section comprise a planar surface, wherein the planar surfaces are angularly spaced from one another about the transverse axis.

5. The variable inlet guide vane system of claim 4 wherein the corresponding planar surfaces of the outer section and the inner section are angularly spaced from one another by a fixed angle in a range between 20 and 40 degrees, inclusively.

6. The variable inlet guide vane system of claim 5 wherein the planar surfaces of the outer sections are disposed perpendicularly to the longitudinal axis in response to the vanes being disposed in the low-trim position.

7. The variable inlet guide vane system of claim 6 wherein the planar surfaces of the outer sections are movable to up to 89 degrees relative to the longitudinal axis, where the planar surfaces of the outer sections are spaced apart from one another to direct the airflow between the outer sections and swirling the airflow about the longitudinal axis.

8. The variable inlet guide vane system of claim 7 wherein the planar surfaces of the outer sections are disposed parallel with the longitudinal axis in response to the vanes being disposed in the high-trim position.

9. The variable inlet guide vane system of claim 8 wherein the planar surfaces of the inner sections are angularly spaced from the longitudinal axis for swirling the airflow about the longitudinal axis in response to the vanes being disposed in any position between the high-trim position and the low-trim position.

10. The variable inlet guide vane system of claim 9 wherein each vane is a single-piece body including the outer section and the inner section.

11. A turbocharger for a motor vehicle, the turbocharger comprising:
  a turbine housing defining a turbine chamber;
  a compressor housing defining a compressor inlet having an inlet diameter adapted to receive an airflow, and the compressor housing further defining a compressor chamber fluidly connected to the compressor inlet;
  a center housing disposed axially between the turbine housing and the compressor housing;
  a turbine wheel disposed in the turbine chamber and driven by exhaust gases;
  a compressor wheel disposed in the compressor chamber for pressurizing the airflow to an internal combustion engine;
  a shaft having a first end connected to the turbine wheel and a second end connected to the compressor wheel, such that the turbine wheel is capable of driving the compressor wheel to increase a pressure of intake air for the internal combustion engine; and
  a variable inlet guide vane system comprising:
    a casing coupled to the compressor housing and forming an intake passage along a longitudinal axis, where the intake passage is fluidly connected to the compressor inlet and disposed upstream of the compressor inlet;
    a plurality of vanes disposed within the intake passage, with each of the vanes extending along a transverse axis that is perpendicular to the longitudinal axis, and wherein each of the vanes is rotatable about the transverse axis between a high-trim position where the casing defines a maximum inlet cross-sectional area for supplying the airflow to the compressor wheel at a high-trim velocity and a low-trim position where the vanes and the casing cooperate with one another to define a minimum inlet cross-sectional area for supplying the airflow to the compressor wheel at a low-trim velocity, wherein the minimum inlet cross-sectional area is smaller than the maximum inlet cross-sectional area such that the low-trim velocity is higher than the high-trim velocity at a common mass flow rate, and each of the vanes comprises:
      an outer section rotatably coupled to the casing and extending along the transverse axis;
      an inner section extending from the outer section and extending along the transverse axis, wherein the entire outer section and the entire inner section are angularly spaced from each other about the transverse axis by a fixed angle such that the inner sections provide a circumferential vector of the low-trim velocity; and
    an actuator configured to move the plurality of vanes between the high-trim position and the low-trim position.

12. The turbocharger of claim 11 wherein the compressor inlet comprises a ported shroud configured to inhibit an onset of a surge condition at a mass flow rate that is lower than a predetermined surge line associated with the compressor wheel.

13. The turbocharger of claim 12 wherein the compressor inlet defines a primary passage and a plurality of supplemental passages disposed parallel to the primary passage, wherein the ported shroud has a wall thickness forming the supplemental passages circumferentially about the primary passage, and each of the supplemental passages extends from a first port that is fluidly connected to the primary passage to a second port that is fluidly connected to the primary passage upstream of the first port.

14. The turbocharger of claim 13 wherein the outer section of each vane has a length that is within a range between 35% and 50% of the inlet diameter of the compressor inlet.

15. The turbocharger of claim 13 wherein the outer sections and the casing cooperate with one another to define the minimum inlet cross-sectional area for providing an axial vector of the low-trim velocity in response to the vanes being disposed in the low-trim position.

16. The turbocharger of claim 15 wherein, in response to the vanes being disposed in the low-trim position, the outer sections of the vanes are disposed adjacent to one another for blocking the airflow between one another, and the inner sections of the vanes are spaced apart from one another for directing the airflow between one another and swirling the airflow about the longitudinal axis.

17. The turbocharger of claim 16 wherein each of the outer section and the inner section comprise a planar surface, wherein the planar surfaces are angularly spaced from one another about the transverse axis.

18. The turbocharger of claim 17 wherein the planar surfaces of the outer sections are disposed perpendicularly to the longitudinal axis in response to the vanes being disposed in the low-trim position.

19. The turbocharger of claim 18 wherein the planar surfaces of the outer sections are movable to up to 89 degrees relative to the longitudinal axis, where the planar surfaces of the outer sections are spaced apart from one another to direct the airflow between the outer sections and swirl the airflow about the longitudinal axis.

20. A turbocharger for a motor vehicle, the turbocharger comprising:
- a turbine housing defining a turbine chamber;
- a compressor housing defining a compressor inlet that forms an intake passage along a longitudinal axis and defines an inlet diameter adapted to receive an airflow, and the compressor housing further defines a compressor chamber fluidly connected to the compressor inlet;
- a center housing disposed axially between the turbine housing and the compressor housing;
- a turbine wheel disposed in the turbine chamber and driven by exhaust gases;
- a compressor wheel disposed in the compressor chamber for pressurizing the airflow to an internal combustion engine;
- a shaft having a first end connected to the turbine wheel and a second end connected to the compressor wheel, such that the turbine wheel is capable of driving the compressor wheel to increase a pressure of intake air for the internal combustion engine; and
- a variable inlet guide vane system coupled to the compressor housing, and the variable inlet guide vane system comprises:
  - a plurality of vanes disposed within the intake passage, with each of the vanes extending along a transverse axis that is perpendicular to the longitudinal axis, and wherein each of the vanes is rotatable about the transverse axis between a high-trim position where the compressor housing defines a maximum inlet cross-sectional area for supplying the airflow to the compressor wheel at a high-trim velocity and a low-trim position where the vanes and the compressor housing cooperate with one another to define a minimum inlet cross-sectional area for supplying the airflow to the compressor wheel at a low-trim velocity, wherein the minimum inlet cross-sectional area is smaller than the maximum inlet cross-sectional area such that the low-trim velocity is higher than the high-trim velocity at a common mass flow rate, and each of the vanes comprises:
    - an outer section rotatably coupled to the casing and extending along the transverse axis;
    - an inner section extending from the outer section and extending along the transverse axis, wherein the entire outer section and the entire inner section are angularly spaced from each other about the transverse axis by a fixed angle such that the inner sections provide a circumferential vector of the low-trim velocity and the outer sections and the casing cooperate with one another to define the minimum inlet cross-sectional area for providing an axial vector of the low-trim velocity; and
  - an actuator configured to move the plurality of vanes between the high-trim position and the low-trim position.

* * * * *